Feb. 16, 1965  J. R. JOHNSON  3,169,441
PHOTOGRAPHIC APPARATUS
Filed March 15, 1960  2 Sheets-Sheet 1

INVENTOR
JAMES R. JOHNSON

BY FULWIDER, MATTINGLY & HUNTLEY
ATTORNEYS

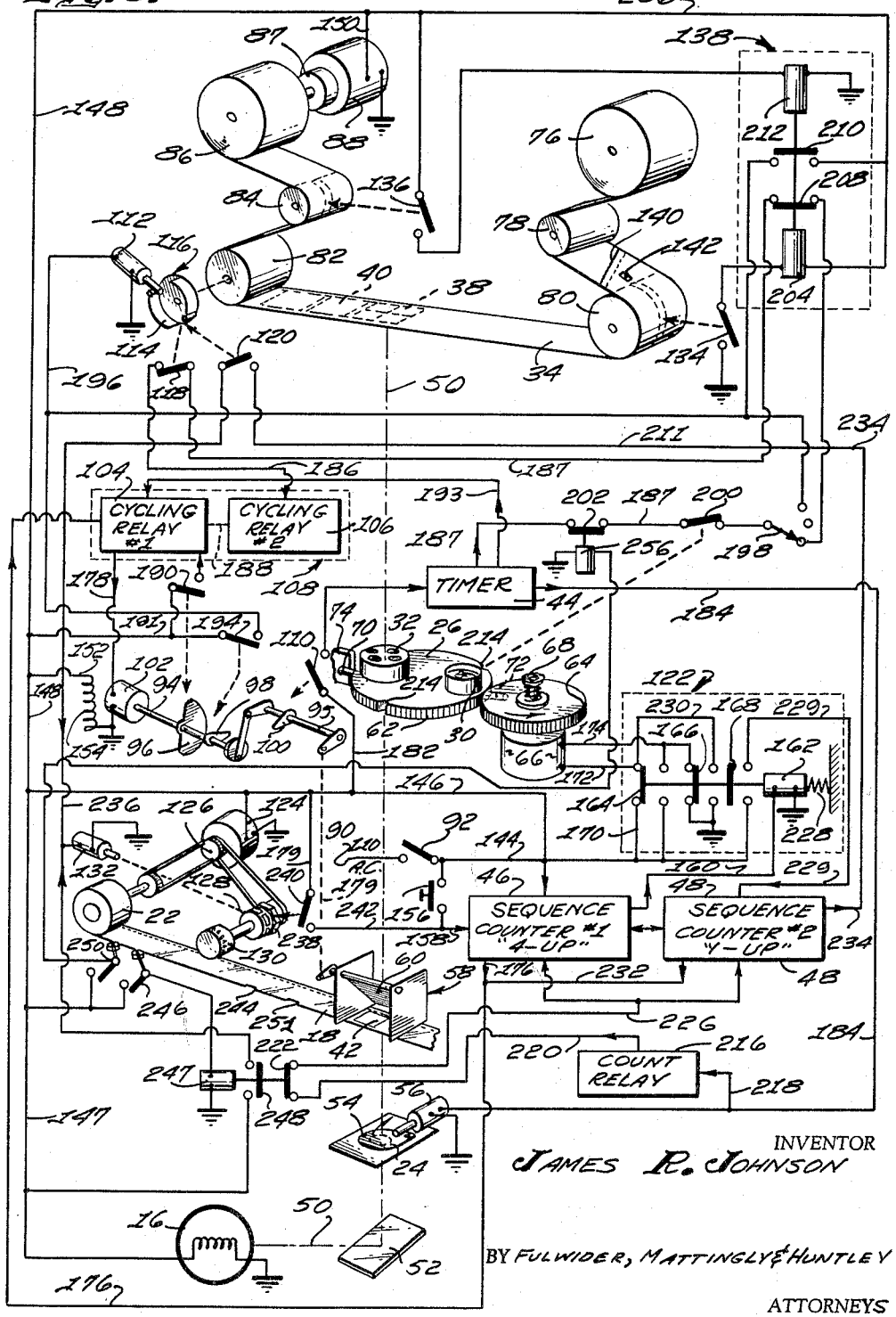

3,169,441
PHOTOGRAPHIC APPARATUS
James R. Johnson, Tujunga, Calif., assignor, by mesne assignments, to Edwards Photography, Glendale, Calif., a corporation of California
Filed Mar. 15, 1960, Ser. No. 15,130
16 Claims. (Cl. 88—24)

The present invention relates generally to photographic apparatus, and more particularly to photographic apparatus for automatically making under substantially the same environmental conditions a predetermined number of prints of each of a predetermined number of sizes from each of a series of photographic negatives.

In certain areas of commercial photography, such as in the production of portraits of school children, it is common practice to produce an assortment of sizes of prints for each individual child. Thus, a photographer may visit a given school or other institution and photograph each child, utilizing photographic equipment which carries the exposed negatives on a continuous roll or strip of film. After the roll of film is developed, the next step is to print the negative of each child in accordance with his order, and customarily the child is offered two sizes of prints from which to select, an enlargement of a particular size and a wallet size print. Thus, one practical commercial arrangement is to offer each member of the group four wallet sized prints and one enlargement of the same exposure at a predetermined basic price. The present invention is concerned with the automatic production of such different sized prints, and in the number of each that is desired.

Past and presently known photographic printing apparatus suitable for producing such a group of prints is at best semi-automatic in character. For instance, such apparatus frequently requires that the operator install the correct negative carrier, lens, and paper mask for each size print to be made, adjust the machine for the correct exposure time, and then press and release a foot switch to make each exposure. After each exposure the strip of printing paper is automatically advanced, and to this extent the machine may be said to be semi-automatic. However, it is not automatic in other respects. The operator must make an individual determination at the time of each exposure whether or not an additional print is needed, whether or not a different size lens is necessary on the next exposure of the negative, or whether or not the order on that negative is completed and the next negative should be exposed. Each of these operations, including the changing of the exposure time, the changing of lenses, negatives, etc., must be carried out manually by the operator.

It is, therefore, an object of the present invention to provide photographic printing apparatus which can be automatically programmed to produce a predetermined number of each of a plurality of sizes of prints from each of a plurality of negatives in a predetermined sequence, and under substantially the same environmental conditions. That is, unless the various sizes of prints are made under the same conditions, it is difficult to reproduce the same exposure, quality, and light balance on the finished prints.

It is a further object of this invention to provide an automatic photographic printer which permits an individual enlargement to be printed upon a single strip of printing paper immediately adjacent a desired number of wallet sized prints.

It is a yet further object of this invention to provide photographic printing apparatus in which the printing light source is constantly left on and is controlled in operation by a shutter in order to insure greater uniformity of reproduction.

It is another object of this invention to provide phographic printing apparatus adapted to produce prints of different sizes with an efficiency and uniformity of reproduction not heretofore obtainable.

It is another object of this invention to provide automatic printing apparatus which produces prints on a continuous length of photographic paper with a uniformity which greatly simplifies the task of cutting and packaging orders for prints of various sizes.

It is still another object of this invention to provide an automatic photographic printer having a rotatably mounted turret supporting a plurality of lenses, and driven between two or more positions automatically and synchronously with the operation of a film transport mechanism.

Briefly, in accordance with one aspect of the present invention, the foregoing objects are achieved by providing additional circuitry and controls for existing printers to thereby provide automatic processing of a roll or strip of film for the production of a predetermined number of prints of each negative, and, in various sizes. The improved apparatus according to the present invention will thus comprise, broadly, a shutter controlled light source for directing light through a negative on the roll, and through a lens system to form the print on a strip of photographic paper. The printing paper is conveniently carried on a roll which is automatically advanced after each exposure in accordance with known techniques in the art. The plurality of lens for the different sizes of prints are preferably mounted on a motor driven turret whose position is automatically controlled to select the proper lens or group of lenses. The film advancing apparatus comprises a motor driven film transport whose operation is synchronized with that of the paper advance apparatus, the lens turret, and the shutter control mechanism so that a predetermined sequence of printing operations is automatically performed in processing the strip of film.

Other objects, features, and advantages of the present invention will be more fully apparent to those skilled in the art from the following detailed description taken in connection with the accompanying drawings in which like reference characters refer to like parts throughout, and wherein:

FIGURE 3 is a combined block and circuit diagram of the apparatus shown in FIGURE 1.

Figure 1:
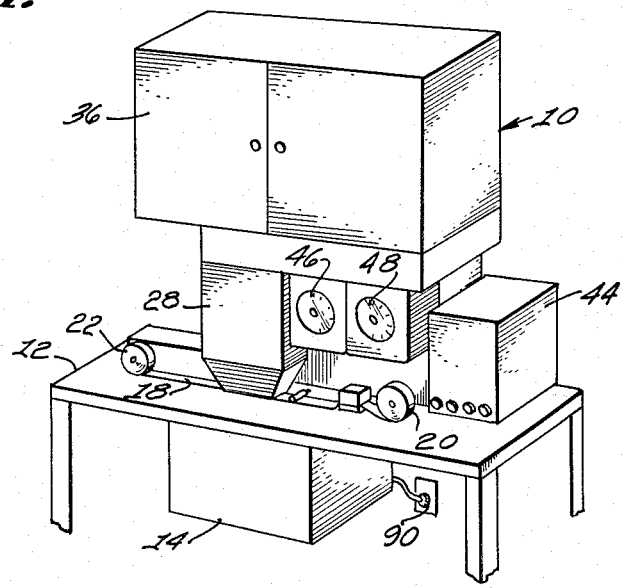
FIGURE 1 is a perspective view of an automatic photographic printer in accordance with the present invention.

Referring now to the drawings, there is illustrated in FIGURE 1 a perspective view of an automatic printer 10 embodying the principles of the present invention. Printer 10 is conveniently mounted on a table 12 from which a lamp housing 14 is supported in depending relation. A printing lamp 16 (shown in the schematic diagram of FIGURE 2) is mounted in lamp housing 14 in any suitable manner.

A strip of developed negative film 18 is supplied from a feed roll 20 to a pick up roll 22 by a film transport mechanism to be described in detail below which is operative to move film 18 across the top of table 12 to thereby position the particular negative of film 18 which is to be printed above the light opening of lamp housing 14.

Exposure lamp 16 is preferably left on continuously during the operation of printer 10, the duration of exposure of a given negative being controlled by opening and closing a shutter 24 which is interposed between lamp 16 and film 18. Shutter 24 is solenoid operated in a manner which will be described below.

A lens turret 26 is mounted in a lens housing 28 above the properly positioned negative of film 18 on table 12. Turret 26 is motor operated, as will be seen, for rotatable movement to a selected one of a pair of positions to thereby locate a desired lens 30 or a group of lenses 32 between film 18 and a strip 34 of photographic printing paper mounted in a roll head housing 36. The mounting of the printing paper within housing 36 may be in any suitable fashion.

Figure 2:
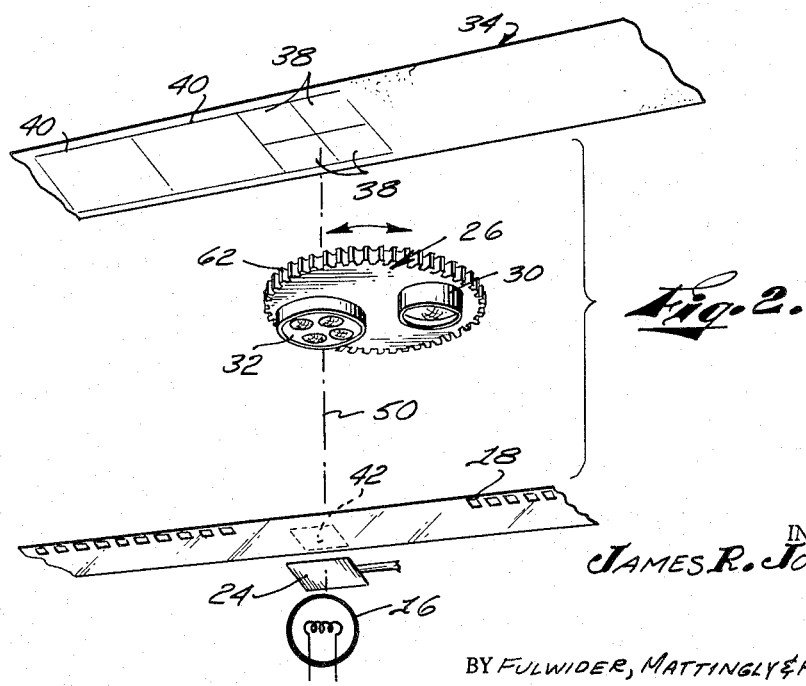
FIGURE 2 is a diagrammatic view illustrating the basic relationship of the light source, the film, the lens turret and the photographic paper in carrying out the principles of the invention.

In FIGURE 2, turret 26 is illustrated in the position where the lens system or group 32 is interposed in the optical path between lamp 16 and print paper 34. Lens group 32 conveniently comprises four separate lenses which each simultaneously forms a separate image or print of the same negative, the lenses being so arranged as to form adjacent prints 38 on paper 34 as illustrated. These four adjacent prints 38 are sometimes conveniently referred to as a set of four wallet size prints. Lens 30 is conveniently a single enlargement lens affording a magnification such that a single image or print 40 is formed on paper 34, print 40 occupying approximately the same area on printing paper 34 as would the four wallet size prints 38. Thus, lens 30 when in operating position produces enlargement print 40 on paper 34 from a negative frame 42 which may also be projected by lens group 32 to produce four wallet size prints 38 when group 32 is in operating position. It is extremely important to note that in this manner prints 38 and 40 will have approximately the same light balance, contrast, and general appearance since the environmental conditions, including the light conditions, paper, and temperature, were the same for each.

The duration of each exposure, that is, the length of time shutter 24 is in the open position, is automatically controlled by a photo exposure control unit or timer 44 of a type which is well known in the art, as will be seen.

When shutter 24 is closed at the end of any given exposure, an impulse or signal is sent to one of two counters 46 and 48 which have been pre-set to establish the program of printing to be carried out. That is, counter 46 is set at a value or position which determines the number of times that lens group 32 will be positioned for a printing operation to form prints 38, and counter 48 is similarly set at a value or position which determines the number of times that lens 30 will be positioned for a printing operation on the same negative to form prints 40 adjacent prints 38 on the same strip of printing paper 34. Thus, automatic printer 10, including the paper advance mechanism, the film advance or transport mechanism, motor driven turret 26, and shutter 24 are under the control of counters 46 and 48. Each of these counters 46 and 48 is commercially available, an example thereof being the "Microflex" Reset Counter, HZ Series, manufactured by the Eagle Signal Corporation of Moline, Illinois. The counter is operative, when energized by operating a start switch, to close its internal contacts, and, after receiving a pre-determined number of impulses or input signals, which are pre-set by adjusting the dial of the counter, the counter internal contacts are opened. The effect of this will be explained later in connection with FIGURE 3. Further, the counter is operative when it has received such a pre-determined number of impulses or input signals to provide an output signal. This output signal can be used as the input signal for energizing another counter, which is the arrangement used in the present invention.

More specifically, it may be desired to incorporate a series of prints 38 and 40 on a single 5" wide strip of print paper, the number of each being predetermined. Assuming a school or other group requested production of twelve wallet size prints 38 and two enlargement prints 40 for each individual photographed, the counter 46 is set at three so that three sets of four wallet size prints 38 would be printed to provide the order. The counter 48 would be set at two in order to program the printer 10 to produce two enlargement prints 40 after printer 10 has completed printing the three sets of four wallet size prints 38. With the paper and film rolls loaded, and counters 46 and 48 set, starting of printer 10 will cause printer 10 to continue to operate until the desired number of exposures have been made of each frame 42 on film 18. The exposed roll of printing paper 34 is thereafter developed in any convenient manner, as is well known in the art. Since each of the prints 38 and 40 for any given order or negative frame 42 are in continuous sequence on the same roll of print paper 34, the roll can easily be cut in a standardized fashion to thereby simplify the assembly and packaging of the individual orders.

Reference is made to FIGURE 3 for a detailed description of the structure and operation of printer 10. Of course, it will be understood that the system to be described herein is merely one exemplary preferred embodiment and that other circuit techniques could alternatively be used. However, the embodiment herein shown and described has been in actual operation, and has given excellent results.

*Major structural components and arrangement*

Printing lamp 16 is shown emitting a beam of light 50 which is reflected by a suitably supported mirror 52 through an aperture 54 normally covered by shutter 24. Shutter 24 is actuated by a shutter solenoid 56 which is suitably connected to shutter 24 to pivot it between its open and closed positions, energization of solenoid 56 serving to pivot shutter 24 open, while de-energization of solenoid 56 acts to close shutter 24 over aperture 54.

When light beam 50 is passed by shutter 24, it projects upon frame 42 of film strip 18 which is in printing position above shutter 24. A hood assembly 58 is provided above film 18, and includes a pivotable hood 60 which must be moved out of the path of light beam 50 to permit a print to be made. Hood 60 is provided to shield film 18 from stray light, shield the operator from the bright light of lamp 16, and, most important, to provide a means whereby light 16 may be constantly left on to obtain the advantages of its steady state operation. Exposure of paper 34 is thus controlled by moving shutter 24 and not by turning light 16 on and off. As can be seen from FIGURE 1, printing lamp 16, mirror 52, and shutter 24 are located in lamp housing 14, film 18 is positioned on the surface of table 12, while hood 60 and lens turret 26 are located in lens housing 28.

Turret 26, which carries lenses 30 and 32, is mounted in any suitable manner for rotation, and for this purpose is provided in its edge face with gear teeth 62 which mate with the teeth of a gear 64 which is driven by the output shaft of a reversible direction turret drive motor 66 through a suitable clutch arrangement 68. Turret assembly 26 has projecting from its underside first and second projections 70 and 72 which are positioned approximately 180 degrees apart and are each adapted to abut against a rigidly positioned stop member 74 in order to establish the two operative positions for lenses 32 and 30, respectively, in the path of light beam 50. Motor 66 is constantly energized to urge turret assembly 26 in one direction or the other. However, gear 64 does not turn because clutch 68 is tight enough to prevent rotation, although it is still loose enough to cushion the contact between the projections and stop member 74. In the position shown in FIGURE 3, turret 26 is being urged in a clockwise direction so that projection 70 is held firmly in abutment against stop 74 so as to firmly and securely position lens 32 exactly in the desired position. When it is desired to interchange lens 30 for lens 32, the energization of motor 66 is reversed so as to rotate turret 26 in the opposite direction, thereby urging projection 72 against the opposite side of stop member 74. In this manner, lens 30 can also be securely and fixedly held in position in the path of light beam 50.

After passing through lenses 30 or 32, light beam 50 is projected upon photographic printing paper 34 to form the desired print or prints, paper 34 having automatically advanced to provide an unexposed surface for the print, as will be seen.

Printing paper 34 is fed from a paper feed roll 76 around idler and reversing rolls 78 and 80 to printing position in the path of light beam 50. The exposed paper is carried on to reversing and idler rolls 82 and 84 from which it is supplied to the take-up roll 86, which is driven through a clutch arrangement 87 by a roll head drive motor 88. The roll head drive mechanism and control thereof for the printing paper as such are old in the art, and for brevity the details thereof are not included inasmuch as they do not form a part of the present invention. One suitable drive motor for this purpose is Type KCI–23RB, 115 A.C., 60 cycle, single phase, continuous duty, manufactured by the Bodine Electric Company.

Printer 10 derives its power from a source 90 of voltage which may conveniently be 110 volt alternating current line power, to which connection is made through a main on-off switch 92.

A shaft 94 rigidly mounts a 180° cam 96 and a 22½° cam 98, and is pivotally connected by a conventional Pitman linkage to a suitably supported shaft 95 which carries an actuating cam 100. Shaft 94 is driven by a shutter drive and cycling motor 102 which in turn is controlled by a pair of cycling relays 104 and 106 of a cycling relay unit 108.

Cam 100 is mechanically linked to a movable switch 110 of a microswitch, the position of switch 110 making or breaking a circuit through timer 44 to shutter solenoid 56 to open or close shutter 24 in accordance with the position of switch 110.

A paper advance solenoid 112 is energizable to control the feed of paper 34 by pulling in to release a cam surface 114 of a cam 116. When cam 116 is released, the continuously running roll head drive motor 88 drives paper roll 82 until the plunger of solenoid 112 rides off cam surface 114 into a slot. A pair of microswitches 118 and 120 are mechanically linked to paper feed cam 116, being actuated thereby for purposes which will become apparent.

A reversing or turret relay 122 is provided to reverse the direction of rotation of the turret drive motor 66 by reversing the polarity of the current supplied thereto, as will be described below. Turret relay 122 also shifts power from counter 46 to counter 48.

The film transport mechanism is driven through a suitable clutch mechanism 126 by a film transport motor 124. Motor 124, through clutch 126, drives film pick-up roll 22, and also drives a film advance roller 128 which carries a film sprocket 130 at its outer end for engagement and advancement of film 18. Roller 128 is provided with a plurality of detents engageable by the plunger of a film actuator solenoid 132 to stop rotation of roller 128, and consequently stopping the advancing of film 18. When solenoid 132 is energized, the core thereof is pulled in to permit roller 128 to rotate.

The paper feed mechanism is provided with a splice sensing circuit which includes a pair of microswitches 134 and 136 which function to prevent the present apparatus from printing on any portion of the paper 34 fed from roller 76 which contains a splice and is therefore not useable. This splice sensing circuit also includes a holding relay 138 actuable by microswitch 134 when a splice first appears. Actuation of relay 138 then prevents operation of the film transport mechanism and the printer mechanism until the splice has passed, as indicated by the sensing of the splice by microswitch 136. Both of switches 134 and 136 are mechanically coupled to roller arms (not shown) which ride upon paper 34 in alignment with grooves cut in the peripheries of reversing roll 80 and idler roll 84, respectively. At each splice 140 an opening 142 is cut, and when splice 140 approaches either of switches 134 or 136, the roller arm thereof drops into opening 142 to close its associated switch 134 or 136.

It is to be understood that the preferred embodiment of the present printer 10 described herein employs much of the apparatus which is presently a part of the well known Kodak Velox Rapid Roll Paper Printer above referred to, and the Kodak Roll Paper Head (Model C–2) attachment therefor. Consequently, since this machine is commercially available, no great amount of detail will be included herein to describe apparatus now forming a part of that machine. Rather, a brief description of the general function of such apparatus will be made instead. This same treatment will be accorded the commercially available timer 44 and Microlex counters 46 and 48. Thus, the print paper advance apparatus; the light source and shutter apparatus; cycling relay unit 108; the cycling cam apparatus, including shutter drive and cycling motor 102; and counters 46 and 48 will be described only generally for brevity and clarity. Further detail would only serve to obscure the novel features of the present printer 10.

A description of the operation of printer 10 will next be made, the sub-operations being separately titled for convenience.

Shutter and turret operation

Assuming that timer 44 has been pre-set to give the proper exposure time, as determined through experience or by trial and error, and further assuming that negative frame 42 is in position and it is desired to have three sets of wallet size prints 38 and two enlargement prints 40 of frame 42, the first step is to set counter 46 at three, and counter 48 at two. Next, main on-off switch 92 is closed to energize printer 10 from power source 90. Closure of switch 92 also provides power through leads 144, 146, 148, and 150 to energize roll head drive motor 88. Motor 88 then begins to operate, but is unable to effect advancement of paper 34 because paper advance solenoid 112 is in engagement with and prevents rotation of cam 116. Closure of main switch 92 also provides power through leads 144, 146, 148, and 152 to energize the field coil 154 (shown separate from motor 102 for clarity) of shutter drive and cycling motor 102, readying it for a start impulse from cycling relay unit 108, as will be seen.

Power is also now supplied to lamp 16 through leads 144, 146, and 147.

A start switch 156 is next manually closed to provide an impulse of power from source 90 through lead 158 to counter 46, it being noted that switch 156 is then biased back to open position. Closure of switch 156 provides an input signal to counter 46 which closes several internal switches (not shown), one set of switches serving to energize or set the "clutch coil" of the counter 46. In parallel with this clutch coil through a lead 160 is a solenoid 162 of turret relay 122. FIGURE 3 illustrates solenoid 162 in its energized state with ganged switches 164, 166, and 168 thereof moved to the left by movement to the left of the solenoid core. In this position, switches 164 and 166 serve to pass power from source 90 to turret drive motor 66 to ground through leads 144, 170, and 174. This direction of current to motor 66 acts to drive it counterclockwise, bringing projection 70 up against stop member 74. Turret 26 remains in this position during the time that solenoid 162 and the clutch coil of counter 46 are energized. The clutched motor 66 remains energized, but does not turn because of the tightness of clutch 68.

The internal switches of counter 46 which were closed by the input signal introduced by closure of switch 156 also send a pulse of power of relatively short duration to energize cycling relay 104 through a lead 176, it being noted that cycling relay unit 108 is constructed such that when relay 104 is energized or closed, the other relay 106 assumes the opposite or open condition.

The short duration pulse or energization of relay 104 passes power from counter 46 to shutter drive and cycling motor 102 through a lead 178. This energization of motor 102 by relay 104 is effective to rotate shaft 94 in a clockwise direction, and through a linkage 179 hood 60 is moved out of the path of light beam 50. As will be seen, shaft 94 rotates through 180 degrees by reason of the energization of motor 102 at this time, and, just prior to completing this 180 degree rotation, cam 96 closes switch 190 to pass power from lead 191 into relay 104, and thence back out lead 178 to motor 102. At approximately this time, the power pulse from counter 46 has terminated, and motor 102 is drawing its power from lead 191 through switch 190, and lead 178.

Just after cam 96 has closed switch 190, as described, actuating cam 100 on shaft 95 closes a switch 110, which connects power to timer 44 from a lead 182. Energization of timer 44 closes the internal relay of timer 44 and power flows from timer 44 through a lead 186 to relay 106. This closes relay 106, and opens relay 104 which cuts off power from relay 104 to motor 102 and motor 102 stops. This stoppage occurs after shaft 94 has rotated through approximately 180 degrees.

During the time motor 102 is stopped the exposure of paper 34 occurs. This is accomplished through the action of timer 44, which not only causes power to flow through lead 186, but also causes power to flow through lead 184, and through a guard circuit 187 (to be described subsequently) to energize shutter solenoid 56. Shutter 24 is then caused to pivot out of the path of light beam 50 to permit exposure of paper 34 through lens 32.

Also during the time motor 102 is stopped, the Pitman linkage connecting shaft 95 to shaft 94 is effective to hold hood 60 open, and also maintain switch 110 in closed position.

Upon elapse of the pre-set exposure time to which timer 44 was adjusted, power is cut off from solenoid 56 by the closing of the relay in timer 44, and consequently shutter 24 closes. In addition, the closing of the relay in timer 44 passes power from timer 44 through a lead 191 to relay 104 to close it and open relay 106. The closing of relay 104 again completes the power circuit to motor 102 through switch 190, which, as stated, is in its closed position. Motor 102 rotates shaft 94 as long as switch 190 is kept closed by cam 96, and when switch 190 rides off cam 96 after another 180 degrees of travel of shaft 94, switch 190 will open and power will be cut off from motor 102. Shaft 94 has now gone through a full 360 degrees of travel. As will be seen, this second 180 degrees of rotation effects the advance of paper 34, and, to accomplish this, power must go through guard circuit 187.

When the power is thus cut off from motor 102, relay 104 still remaining closed, it is seen that relay 104 is thus ready to pass a new input pulse from one of the counters to motor 102 for the next cycle.

It is noted that any suitable, commercially available photographic timer may be used in the present invention, one acceptable type being known as the Kodak Photoelectric Control Unit, Model D for Kodak Velox Rapid Printers (Parts List No. 9002A) sold by Eastman Kodak Company of Rochester, New York.

During the second 180 degrees of travel of shaft 94, that is, after the exposure of paper 34 has taken place, paper 34 is advanced in preparation for the next exposure. The manner of accomplishment of this advancement will next be described, it being noted that thus far printer 10 has operated to expose paper 34 through lens group 32 to produce one set of four exposures for four wallet size prints 38.

*Paper advance operation*

During the second 180 degree rotation of shaft 94, cam 98 closes a switch 194 to provide power through a lead 196 to paper advance solenoid 112. Energization of solenoid 112 pulls in its core to permit cam 116 to rotate so that paper 34 may be advanced. When solenoid 112 enters the next slot between the pair of cam surfaces 114 of cam 116, cam 116 is again brought to a stop. The travel of solenoid 112 over a cam surface 114 is just sufficient to permit paper 34 to advance one frame for the next exposure.

*Paper guard switch and override circuits*

It is particularly noted that when rotation of cam 116 first occurred, that is, during the second 180 degrees of travel of shaft 94, normally closed paper guard switch 118 was opened by cam surface 114. Switch 118 is connected in series with guard circuit 187 which must be unbroken to permit timer 44 to energize solenoid 56 to open shutter 24 for the printing operation. That is, if this circuit 187 is broken, shutter 24 cannot be operated, and paper 34 thus cannot be inadvertently exposed while it is being advanced.

This circuit 187 of switch 118 is connected in series with timer 44 and includes holding relay 138, a printer stop and advance switch 198, a turret guard switch 200, and a film advance switch 202, all of these being connected in series so that no printing can occur while any one or more of these switches is open.

More specifically, holding relay 138 is energized to break the printing circuit when a splice 140 is detected and printing thereon is not desired. Switch 134, by a suitable mechanical linkage, drops into the groove in reversing roll 80 through the opening 142 which was pre-punched to indicate the existence of splice 140. This completes a circuit from power source 90 to a solenoid 204 through a lead 206, and energization of solenoid 204 opens a switch 208 to break guard circuit 187. Simultaneously, a switch 210 of holding relay 138 is closed, and this passes power from lead 206, through switch 210, a lead 211, and lead 196 to hold paper advance solenoid 112 disengaged from cam surfaces 114. As previously described, energization of solenoid 112 permits paper 34 to advance, and this continues until hole 142 is sensed by switch 136 which operates in the same manner as switch 134 to signal that splice 140 has moved out of the path of exposure. Closure of switch 136 provides power from lead 148 to the other solenoid 212 of holding relay 138, and the consequent energization of solenoid 212 positions switches 208 and 210 as illustrated in FIGURE 3.

Printer stop and advance switch 198 is provided so that the printing cycle may be manually stopped or advanced, as desired.

Switch 202 is associated with the operation of the film transport apparatus and will be described subsequently.

Turret guard switch 200 is mechanically linked to turret 26, and is closed only when the linkage thereof drops into one of a pair of notches 214 formed in turret 26. These notches are so located that they are out of operative engagement with turret guard switch 200 unless either lens 30 or 32 is in precise position to intercept light beam 50. This insures that no printing will occur until lens 30 or 32 is in absolutely precise position to properly expose paper 34.

*Repeat cycle for counter 46 and transfer to counter 48*

When timer 44 pulses solenoid 56 to move shutter 24 to make an exposure, this same pulse from timer 44 passes into a count relay 216 through a lead 218. Relay 216 forms an integral part of counters 46 and 48, but is shown separately on the drawing for convenience.

Energization of relay 216 closes its internal contacts to pass a signal through a lead 220, a "no-count" switch 222, and a lead 226 to counter 46. This signal energizes the "count coil" of counter 46, and this single count is internally registered within counter 46. Since the clutch coil of counter 46 is still energized, that is, the count of three has not yet been reached, counter 46 after a short, predetermined time interval again switches power to relay 104 to energize shutter drive and cycling motor 102 to repeat the print cycle. When the count through count relay 216 to counter 46 reaches three, the desired number of exposures previously set into counter 46, the clutch coil of counter 46 is de-energized, and the power which is being provided through lead 160 to turret solenoid 162 is cut off, and switches 164, 166, and 168 are moved to the right by the bias of a spring 228. Power to counter 48 is now provided through lead 144, switch 168, and lead 229. This power energizes the clutch coil of counter 48, placing the operation of printer 10 under the control of counter 48.

*Turret reversal and film transport*

The changed positions of switches 164 and 166 effect a change in the direction of current through motor 66. Power now passes from lead 144, through switch 164, and lead 174 to motor 66, the current thus being the reverse of what it previously had been when counter 46 controlled the operation of printer 10. The circuit from motor 66 is completed to ground through lead 172, a lead 230, and switch 166.

The reversal of current causes motor 66 to rotate in the opposite direction until projection 72 abuts against stop member 74 to thereby place lens 30 in operative position.

Simultaneously with energization of motor 66, counter 48 also passes a short duration power pulse through a lead 232, to lead 176 and thence to relay 104 to actuate hood 60 and shutter 24, as previously described in connection with counter 46. The print cycle is identical and occurs twice, the value pre-set in counter 48, after which the clutch coil of counter 48 is de-energized, and counter 48 switches power to film actuator solenoid 132 through a lead 234, switch 120, and a lead 236.

Thus, after completion of the print cycle and during movement of the print paper for the next cycle, solenoid 132 is energized momentarily to disengage from one of a plurality of detents (not shown) provided in roller 128. These detents are spaced about the periphery of roller 128, the spacing being such that upon each disengagement of solenoid 132 with roller 128 film 18 will advance one negative frame. In addition, each time film 18 advances one negative frame, one of a plurality of projections 238 will engage a switch 240. These projections 238, like the detents provided in roller 128, are spaced about the periphery of roller 128 such that when projection 238 will engage and close switch 240 each time film 18 is advanced one negative frame. Closure of switch 240 through a lead 242 energizes or resets counter 46 for another cycle of operation, this time on a new negative frame. The cycle of operation previously discussed is repeated for the new negative frame, in accordance with the pre-set values set into counters 46 and 48.

*Single frame and stop switches*

In the event it is desired to print only a single frame of any particular negative, rather than the program of prints pre-set into counters 46 and 48, a notch 244 is cut in the edge of film 18 for this purpose. More particularly, a microswitch 246 is positioned to be actuated by notch 244 a predetermined distance ahead of any given frame for which only a single print in each lens position is desired. Thus, when only a single print of a negative is desired a notch is cut in the edge of film 18 so many frames ahead of the negative, as determined by the position of switch 246.

When switch 246 drops into notch 244 power is passed through a relay coil 247, and the energization of this coil 247 passes power through a switch 248 to solenoid 132, permitting film 18 to be advanced immediately after one exposure or print is made.

Energization of relay coil 247 also opens a switch 222, breaking the circuit between count relay 216 and counter 46. This has the effect of not counting the print made on that particular negative, so that the pre-set count in counters 46 and 48 is not disturbed for the next negative frame.

A switch 250 is used to break guard circuit 187, thereby preventing exposure of a negative, when it is desired to stop the printing action completely.

Thus, for example, film 18 may have completely passed through the exposure area, and it is time to insert another strip of film 18. However, unless printer 10 is able to sense this the print cycle will continue, and paper 34 will continue to advance. To prevent this, a notch 251, similar to notch 244, is cut in the edge of film 18. Notch 251 is placed a predetermined distance ahead of the particular negative frame concerned, the spacing being determined by the position or relative location of switch 250. It is noted that switches 246 and 250 are not spaced apart a distance greater than the width of a negative frame. With this arrangement notches 244 and 251 cannot both actuate one of the switches 246 and 250. That is, assuming notch 244 was engaged by switch 246, the next advance of film 18 would carry notch 244 beyond switch 250 so that only a momentary engagement would occur.

Closure of switch 250 is operative to pass power to a solenoid 256, energization of which opens a switch 202 which is a part of guard circuit 187. Opening of switch 202 will break guard circuit 187, and, as previously explained, this will prevent timer 44 from actuating solenoid 56 and therefore no movement of shutter 24 will occur.

From the above it will be seen that a new and novel form of printer 10 has been provided which is adapted to produce a predetermined number of prints of each of a predetermined number of sizes from each of the series of photographic negatives, all of these prints being made under substantially the same environmental conditions. Printer 10 is particularly effective to provide automatically a desired number of wallet sized prints and a desired number of individual enlargements all upon the same strip of printed paper.

While there has been shown herein what is considered to be the preferred embodiment of the present invention, it will be apparent that various modifications and changes may be made with respect to the foregoing description without departing from the spirit of the invention or the scope of the following claims.

I claim:

1. Photographic apparatus for automatically making a predetermined number of prints from a series of negative frames in the form of a length of film, said apparatus comprising:

paper advance means operative to advance a length of print paper across an exposure area;

paper advance control means electrically actuable to operate said paper advance means to advance said print paper across said exposure area;

means for projecting a beam of light and including light control means electrically actuable to effect projection of said beam onto said print paper at said exposure area, and, after a predetermined time interval, generate an output signal;

film transport means operative to advance a length of film across the path of said beam;

film actuator means engageable with said film transport means and electrically actuable to operate said film transport means;

a lens positioned in the path of said beam between said print paper and said film;

control apparatus in electrical circuit with said light control means and said paper advance control means and operative in response to an electrical signal to actuate said light control means, and operative in response to said output signal of said light control means to actuate said paper advance control means;

counter means for repeatedly generating separate first and second electrical signals to operate said control apparatus and said film actuator means, respectively, said counter means including clock means connected in parallel with said light control means to count each electrical actuation of said light control means by said first signals to thereby control the generation, interval and number of said first and second electrical signals in accordance with a predetermined setting of said counter means;

and switch means in circuit with said film actuator means and said counter means, and engageable by said paper advance means upon actuation thereof to convey said second signals from said counter means for electrical actuation of said film actuator means.

2. Photographic apparatus as set forth in claim 1 wherein a series of negative frames in the form of a length of film are to be printed, said photographic apparatus including:

normally open switch means in circuit with said counter means and a source of power and engageable by said film transport means for closure when said film transport means are operated to thereby energize said counter means for a new count cycle.

3. Photographic apparatus as set forth in claim 1 which includes:

relay means having a normally closed guard switch in series with said light control means;

a pair of switch means, each in circuit with said relay means and a source of power and alternately operable for energizing said relay means to close and open said guard switch, respectively, each of said switch means being normally engageable with said length of print paper at opposite ends thereof and operative to energize said relay means upon disengagement from said print paper, whereby disengagement of one of said switch means breaks the circuit of said light control means, and the other of said switch means makes said circuit.

4. Photographic apparatus as set forth in claim 1 wherein a series of negative frames in the form of a length of film are to be printed, said photographic apparatus including:

normally open switch means in circuit with said film actuator means and a source of power and having a switch element normally engageable with the edge of said film and disengageable to close said last-mentioned switch means to thereby actuate said film actuator means.

5. Photographic apparatus as set forth in claim 1 wherein a series of negative frames in the form of a length of film are to be printed, said photographic apparatus including:

normally closed switch means in series with said light control means and having a switch element normally engageable with the edge of said film and disengageable to open said last-mentioned switch means to thereby break the circuit to said light control means.

6. Photographic apparatus as set forth in claim 1 wherein a series of negative frames in the form of a length of film are to be printed, said photographic apparatus including:

switch means having a normally open switch in circuit with said film actuator means and a source of power, a normally closed switch in series in the circuit between said clock means and said light control means, and a switch element normally engageable with the edge of said film and disengageable to close said normally open switch and open said normally closed switch to thereby actuate said film actuator means and cut off the count signal to said clock means.

7. Photographic apparatus as set forth in claim 1 and wherein said photographic apparatus includes means having an element engageable with said print paper for sensing imperfections in said print paper to render said means for projecting said beam of light incapable of providing said beam at said exposure area until said paper advance means is operated to move said print paper with said imperfections beyond said exposure area.

8. Photographic apparatus as set forth in claim 1 and wherein said photographic apparatus includes means having an element normally engageable with said film thereby to sense an absence of said film in said film transport means to render said means for projecting said beam of light incapable of providing said beam at said exposure area until additional film is inserted in said film transport means.

9. Photographic apparatus for automatically making a predetermined number of prints of each of a predetermined number of sizes from a negative frame, said apparatus comprising: paper advance means operative to advance a length of print paper across an exposure area; paper advance control means electrically actuable to operate said paper advance means to advance said print paper across said exposure area; means for projecting a beam of light and including light control means electrically actuable to effect projection of said beam onto said print paper at said exposure area, and after a predetermined time interval, generate an output signal; film support means for supporting a negative frame in the path of said beam; a lens turret carrying a plurality of lens sets and selectively rotatable to position one of said lens sets in the path of said beam between said print paper and said negative frame; turret drive means operative to rotate said lens turret to place different ones of said lens sets in said path; control apparatus in electrical circuit with said light control means and said paper advance control means and operative in response to an electrical signal to actuate said light control means, and operative in response to said output signal of said light control means to actuate said paper advance control means; a plurality of electrically coupled counter means, one for each of said sizes, separately operable for repeatedly generating electrical signals to operate said control apparatus, each said counter means including clock means connected in parallel with said light control means to count each electrical actuation of said light control means and operative to limit the generation of electrical signals for said control apparatus by its associated counter means to a predetermined number value, and thereafter effect operation of the next successive counter means; and turret control relay means in electrical circuit with said turret drive means and said plurality of counter means and operable successively by said plurality of counter means to successively place said lens sets in the path of said beam.

10. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; and normally open switch means in circuit with said film actuator means and a source of power and engageable by said paper advance control means for closure when said paper advance control means are actuated.

11. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; normally open switch means in circuit with said film actuator means and a source of power and engageable by said paper advance control means for closure when said paper advance control means are actuated; and a normally open switch means in circuit with one of said plurality of counter means and a source of power and engageable by said film transport means for closure when said film transport means are operated, to thereby energize said one of said plurality of counter means for a new count cycle.

12. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; relay means having a normally closed guard switch in series with said light control means; a pair of switch means, each in circuit with said relay means and a source of power and alternately operable for energizing said relay means to close and open said guard switch, respectively, each of said switch means being normally engageable with said length of print paper at opposite ends thereof and operative to energize said relay means upon disengagement from said print paper, whereby disengagement of one of said switch means breaks the circuit of said light control means, and the other of said switch means makes said circuit.

13. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; normally open switch means in circuit with said film actuator means and a source of power and engageable by said paper advance control means for closure when said paper advance control means are actuated; and normally open switch means in circuit with said film actuator means and a source of power and having a switch element normally engageable with the edge of said film and disengageable to close said last-mentioned switch means to thereby actuate said film actuator means.

14. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; normally open switch means in circuit with said film actuator means and a source of power and engageable by said paper advance control means for closure when said paper advance control means are actuated; and normally closed switch means in series with said light control means and having a switch element normally engageable with the edge of said film and disengageable to open said last-mentioned switch means to thereby break the circuit to said light control means.

15. Photographic apparatus as set forth in claim 9 wherein a series of negative frames in the form of a length of film are to be printed, said photographic apparatus including: film transport means operative to advance said film across the path of said beam; film actuator means engageable with said film transport means and electrically actuable to operate said film transport means; normally open switch means in circuit with said film actuator means and a source of power and engageable by said paper advance control means for closure when said paper advance control means are actuated; and switch means having a normally open switch in circuit with said film actuator means and a source of power, a normally closed switch in series in the circuit between said clock means and said light control means, and a switch element normally engageable with the edge of said film and disengageable to close said normally open switch and open said normally closed switch to thereby actuate said film actuator means and cut off the count signal to said clock means.

16. Photographic apparatus according to claim 9 which includes turret guard switch means having a normally closed switch element connected in series with said light control means, said turret including a plurality of switch positions successively engageable by said turret guard switch means as each of said lens sets successively moves into position in the path of said beam, said switch element being opened upon disengagement between said switch positions and said switch means to break the circuit to said light control means.

References Cited in the file of this patent

UNITED STATES PATENTS

| | | |
|---|---|---|
| 1,819,541 | Carleton | Aug. 18, 1931 |
| 2,227,987 | Tuttle et al. | Jan. 7, 1941 |
| 2,355,779 | Burleigh | Aug. 15, 1944 |
| 2,557,685 | Rabinowitz | June 19, 1951 |
| 2,657,613 | Maker et al. | Nov. 3, 1953 |
| 2,697,378 | Sexton | Dec. 21, 1954 |
| 2,699,703 | Mourfield | Jan. 18, 1955 |
| 2,719,235 | Emerson | Sept. 27, 1955 |
| 2,803,991 | Wagner | Aug. 27, 1957 |
| 2,896,505 | Nations | July 28, 1959 |
| 2,928,328 | Klein | Mar. 15, 1960 |